United States Patent
De Vogel et al.

(10) Patent No.: US 10,587,220 B2
(45) Date of Patent: Mar. 10, 2020

(54) DEVICE AND METHOD FOR ATTACHING ELECTRONIC AUXILIARY COMPONENTS TO A SUPPORT STRUCTURE FOR SOLAR PANELS

(71) Applicant: Esdec B.V., Deventer (NL)

(72) Inventors: Vincent De Vogel, Deventer (NL); Jeroen De Vogel, Deventer (NL); Frank Van Regteren, Deventer (NL); Laurens Te Boekhorst, Deventer (NL)

(73) Assignee: Esdec B.V., Deventer (NL)

( * ) Notice: Subject to any disclaimer, the term of this patent is extended or adjusted under 35 U.S.C. 154(b) by 0 days.

(21) Appl. No.: 15/891,591

(22) Filed: Feb. 8, 2018

(65) Prior Publication Data

US 2018/0226918 A1 Aug. 9, 2018

(30) Foreign Application Priority Data

Feb. 8, 2017 (NL) ..................................... 2018343

(51) Int. Cl.

| | |
|---|---|
| *F24H 9/06* | (2006.01) |
| *H02S 40/30* | (2014.01) |
| *F16B 5/06* | (2006.01) |
| *F16B 2/22* | (2006.01) |
| *H02G 3/30* | (2006.01) |
| *H02S 20/23* | (2014.01) |
| *H02S 20/20* | (2014.01) |
| *H02S 40/36* | (2014.01) |
| *H02S 40/32* | (2014.01) |

(52) U.S. Cl.
CPC ................ *H02S 40/30* (2014.12); *F16B 2/22* (2013.01); *F16B 5/0685* (2013.01); *H02G 3/30* (2013.01); *H02S 20/20* (2014.12); *H02S 20/23* (2014.12); *H02S 40/32* (2014.12); *H02S 40/36* (2014.12); *Y02B 10/12* (2013.01); *Y02B 10/14* (2013.01)

(58) Field of Classification Search
CPC ............ H02G 3/0456; H02G 3/30; F16L 3/24
See application file for complete search history.

(56) References Cited

U.S. PATENT DOCUMENTS

| | | | | |
|---|---|---|---|---|
| 7,686,625 | B1 * | 3/2010 | Dyer ........................ | H01R 4/64 439/857 |
| 8,590,223 | B2 * | 11/2013 | Kilgore .................... | H01R 4/26 52/173.3 |
| 9,911,880 | B2 * | 3/2018 | West ....................... | H02S 20/00 |
| 10,208,874 | B2 * | 2/2019 | Geiger .................... | F24S 80/00 |
| 2014/0154908 | A1 | 6/2014 | Magno et al. | |
| 2014/0202523 | A1 | 7/2014 | Guo | |
| 2014/0220834 | A1 * | 8/2014 | Rizzo .................... | H01L 31/042 439/834 |

FOREIGN PATENT DOCUMENTS

| | | |
|---|---|---|
| CN | 202434495 U | 9/2012 |
| WO | 2014030045 A1 | 2/2014 |
| WO | 2016014042 A1 | 1/2016 |

\* cited by examiner

*Primary Examiner* — Amy J. Sterling
(74) *Attorney, Agent, or Firm* — The Webb Law Firm

(57) ABSTRACT

The invention relates to a device for attaching electronic auxiliary components to a support structure for solar panels. The invention also relates to an assembly, including a support structure for solar panels, and at least one device according to the invention which is attached to the support structure. The invention furthermore relates to a method for attaching an electronic auxiliary component to a support structure for solar panels by using a device according to the invention.

13 Claims, 10 Drawing Sheets

DEVICE AND METHOD FOR ATTACHING ELECTRONIC AUXILIARY COMPONENTS TO A SUPPORT STRUCTURE FOR SOLAR PANELS

CROSS-REFERENCE TO RELATED APPLICATION

This application claims priority to Dutch Patent Application No. 2018343 filed Feb. 8, 2017, the disclosure of which is hereby incorporated in its entirety by reference.

BACKGROUND OF THE INVENTION

Field of the Invention

The invention relates to a device for attaching electronic auxiliary components to a support structure for solar panels. The invention also relates to an assembly, comprising a support structure for solar panels, and at least one device according to the invention attached to the support structure. The invention furthermore relates to a method for attaching an electronic auxiliary component to a support structure for solar panels by using a device according to the invention.

Description of Related Art

When installing solar panels on a roof, generally a pitched roof, the solar panels are connected to one or more electronic inverters for converting the electric direct current (DC) generated by the solar panels into alternating current (AC) or alternating voltage, depending on the electricity grid. With inverters coupled to the grid, configured for connecting to the mains, the direct current is generally converted into an alternating current. Grid-coupled inverters exist in different variants. Often, the one or more inverters are fitted indoors, but it is also conceivable to fit weatherproof inverters outside. In this case, the inverters are generally attached to a wall by means of screws, optionally under a canopy, and preferably in the shadow. However, there is a need for the inverters to be fitted on the roof in the direct vicinity of the solar panels.

It is an object of the invention to provide a device for attaching electronic auxiliary components, in particular an inverter, to a roof.

SUMMARY OF THE INVENTION

To this end, the invention provides a device which, according to the invention, de facto functions as an adapter, which makes it possible to connect an electronic auxiliary component, configured for cooperating with one or more solar panels, in a relatively simple and efficient way with a support structure for solar panels which has already been arranged on a roof. By using the at least one coupling element, each coupling element preferably comprising at least one hook-shaped fastening member, the device can easily be attached, preferably be hooked securely and/or be clamped securely, in particular by means of a snap arrangement, to a support rail of the support structure for solar panels without this requiring separate fastening elements, such as screws. In this case, it is advantageous if at least part of the coupling element, preferably at least part of each hook-shaped fastening element (if used), is deformable, in particular flexible. In addition, the device according to the invention is configured for attaching and securing an electronic auxiliary component, such as an electronic inverter, in a relatively simple and efficient manner with respect to the housing and thus with respect to the device. No separate fastening elements, such as screws, are required to achieve this coupling either. The device according to the invention is thus configured for functioning completely without any screws. Attachment of the electronic auxiliary component to a support rail of a support structure for solar panels, which is generally fastened to a roof, is relatively efficient since use can thus be made of an existing support structure. Therefore, no separate support structure has to be purchased and fitted in order to be able to attach the electronic component and it is not necessary either to attach the electronic auxiliary component to an outer wall or other kind of wall. The support rail is generally used to support one or more solar panels, with the aforementioned solar panels being positioned on top of the support rail. The solar panels are in this case attached to the support rail, generally by means of screws. This makes it possible to position the device according to the invention, and thus an electronic auxiliary component connected to the device, underneath a solar panel which has been installed or is to be installed and to attach it to a part of the support rail which is positioned under the aforementioned solar panel. This has the advantage that the generally heat-sensitive electronic auxiliary component is positioned in the shadow and is thus not exposed to direct sunlight, which generally benefits the durability and reliability of the auxiliary component. In addition, positioning the electronic auxiliary component under a solar panel in this way means that the auxiliary component is not, or at least hardly, visible to passers-by, which is not only advantageous from an aesthetic point of view, but also prevents the generally relatively expensive electronic auxiliary component from being stolen. The electronic auxiliary component which is to be attached to a support structure for solar panels, preferably to a support rail of the aforementioned support structure, by means of the device according to the invention may be of various kinds, but is generally formed by an electronic inverter, by a junction box which is preferably provided with one or more bypass diodes, by an electronic optimizer, or by another type of electronic component in which one or more circuits, generally based on semiconductor technology, are accommodated. The electronic auxiliary component may in this case be provided with a control unit, and is generally provided with electrical energy if necessary—by a solar panel which is connected to the auxiliary component and configured for converting solar energy into electrical energy. In an inverter, electrical energy is converted, for example from DC to DC and/or from DC to AC, by means of electronic components. In this case, the inverter may be coupled to a single solar panel. However, it is also conceivable for the inverter to be coupled to several series-connected solar panels, which is generally referred to as a string inverter. An electronic optimizer is an electronic information-processing unit configured for optimizing (increasing) the efficiency of the effective use of the electrical energy generated by a solar panel. The optimizer is also referred to as an (electronic) efficiency-increasing unit. This optimization generally takes place within the DC network and may increase the conversion efficiency of the solar panel as such and/or of a combination of solar panels and/or of a part of a solar panel.

In operation, the electronic auxiliary components are in fact connected as equipment to one or more solar panels which are fitted to the support structure. In the following, the electronic auxiliary component is also referred to as an auxiliary component.

Attaching the electronic auxiliary component to the device according to the invention is achieved by displacing at least part of the auxiliary component into the at least one receiving space which is partially enclosed by the housing. During and/or after the auxiliary component, or at least part thereof, has been arranged in the receiving space, the auxiliary component will be secured in the receiving space by means of the at least one securing element. The at least one securing element in this case blocks at least part of the access opening which gives the auxiliary component access to the receiving space which is at least partially enclosed by the housing. As a result thereof, it will be possible to prevent undesired decoupling of the auxiliary component with respect to the device. The securing element is preferably displaceable (and/or deformable) between a securing position, in which the securing element at least partially blocks the access opening of the housing, such that at least part of the electronic auxiliary component is secured in the housing, and a non-securing position, in which the securing element substantially leaves the access opening of the housing clear, such that at least part of an electronic auxiliary component can be arranged in the housing. Generally, in the non-securing position of the securing element, it will be possible to remove an auxiliary component which has already been arranged in the receiving space from the receiving space. It is conceivable that the securing element is only displaceable and does not or hardly deform while being displaced. However, it is also conceivable for the securing element to be only elastically deformable (flexible), but not displaceable with respect to a further part of the device. But preferably the securing element, or at least part thereof, will also (elastically) deform while being displaced. In this case, it is conceivable for the securing element to be pivotably connected to a further part of the device. The pivotable connection may in this case be formed, for example, by a film hinge.

The housing preferably defines a (predefined) insertion direction so as to be able to arrange at least part of the electronic auxiliary component in the housing via the access opening. The securing element is preferably configured to be displaced in a direction substantially perpendicular to the aforementioned insertion direction. While arranging at least part of the auxiliary component in the receiving space, the auxiliary component will be able to displace (and/or deform) the securing element from the securing position to the non-securing position, preferably in the aforementioned direction substantially perpendicular to the insertion direction for and the displacing direction of the auxiliary component. In this case, it is preferred if a(n upper) side of the securing element facing the auxiliary component is configured as a shear plane (slide face or guiding surface) to enable the auxiliary component to slide easily with respect to the securing element and consequently to enable the securing element to displace (and/or deform) easily to the non-securing position. Preferably, the upper side of the securing element acting as a shear plane has an inclined (oblique/diagonal) orientation. In this case, a plane enclosed by the inclined upper side of the securing element encloses an angle with the insertion direction of the auxiliary component. In this case, a higher part of the upper side of the securing element will generally face (a head end of) the receiving space, while a lower part of the upper side of the securing element faces away from (the head end of) the receiving space. Such an orientation facilitates simple installation of the auxiliary component, with the auxiliary component being guided into the receiving space via the inclined upper side of the securing element. In addition, such an inclined orientation of the upper side of the securing element renders a simple (undesired) decoupling more difficult, as a result of which the auxiliary component can be secured in a relatively strong, reliable and durable way with respect to the receiving space by means of the securing element.

Preferably, the securing element is in the securing position in an unloaded condition. This means that the securing element at least partially blocks the access opening of the housing in an unloaded condition. In a loaded condition of the securing element, the securing element preferably has a tendency (urge) to displace in the direction of the securing position. This urge benefits the securement and enclosure of the auxiliary component in the housing. The aforementioned urge may be achieved in a simple manner by making the securing element at least partially resilient and/or by connecting the securing element to a further part of the device in a resilient manner.

Preferably, the securing element comprises at least one projecting retaining cam. The retaining cam here preferably projects in a direction facing the access opening of the receiving space. By means of the projecting retaining cam, the access opening can be blocked sufficiently in a relatively efficient and effective way to avoid, or at least prevent, undesired (inadvertent) decoupling of the auxiliary component with respect to the device.

It may be advantageous if the device is provided with at least one stationary guide cam which is positioned at a distance from the displaceable (and/or deformable) securing element and configured for cooperating with a slot which is provided in an electronic auxiliary component. The cooperation between the guide cam and the slot ensures that at least part of the auxiliary component can only be arranged in the receiving space of the housing of the device in a correct manner. In this case, the slot will generally have a non-linear, preferably angular, shape in order to render decoupling of the auxiliary component with respect to the device more difficult. The slot is generally provided in a, preferably projecting, part of a housing of the auxiliary component.

The housing may be relatively closed or relatively open. The housing is generally configured for multilaterally enclosing, preferably gripping around, at least part of an auxiliary component. Generally, the housing comprises at least one lower wall and at least one top wall, wherein the at least one lower wall and the at least one top wall are oriented generally substantially parallel. In this case, it is conceivable for one or more walls to be flexible (resilient). It is also conceivable for the distance between the lower wall and the top wall to be modifiable and can be adapted to (the thickness of) the auxiliary component to be secured. Preferably, at least one coupling element, preferably at least one hook-shaped fastening element, is connected to at least one lower wall of the housing. Generally, the at least one coupling element will be connected to one of the at least one side facing away from the top wall of at least one lower wall of the housing of the device. Preferably, the securing element is connected to at least one lower wall of the housing, with the securing element preferably being enclosed by the aforementioned lower wall. Generally, in an unloaded condition of the securing element, at least part of the securing element projects with respect to a plane enclosed by the lower wall. It is generally advantageous to make the securing element elongated (lip-shaped), with one end of the securing element being connected to a further part of the device, such as a lower wall of the housing, and with an opposite end of the securing element being unattached, and thus not being coupled. The free end of the securing element generally projects in the direction of the access opening in the unloaded condition of the securing element and possibly also (partially) in the loaded condition of the securing element. The housing preferably comprises several spaced-apart top walls which are oriented substantially parallel with respect to each other, with the securing element being positioned between two top walls of the housing. Such a configuration ensures a sufficiently stable securement of the auxiliary component with respect to the device and, on the other hand, results in a saving on material which is advantageous from a financial point of view.

It is conceivable for the device to be provided with at least one additional receiving space and/or additional support structure for holding electric cables. These cables may be accommodated in the aforementioned receiving space in an optionally secured manner and/or may be supported by the support structure in an optionally secured manner. Generally, the additional receiving space and/or the additional support structure is positioned at a distance from the housing of the device in order to limit the ease of use of coupling and decoupling the auxiliary component to and from the device as little as possible.

The device is manufactured as a single piece (made in one piece). At least part of the device is preferably made of at least one or more plastic materials, preferably thermoplastics. If desired, the plastic material (or the several materials) used may be fibre-reinforced by means of, for example, glass fibres. The device can also be produced by means of a one-step process, such as for example by means of extrusion or injection-moulding. It is also conceivable for the device to be made from one or more metals, such as steel, stainless steel or aluminium. A combination of one or more plastics and/or metals is also conceivable.

The invention also relates to an assembly, comprising: a support structure for solar panels, which support structure preferably comprises at least one support rail, and at least one device according to the invention which is attached to the support structure, in particular to the support rail. The assembly preferably also comprises an electronic auxiliary component, with at least part of the electronic auxiliary component being accommodated in a receiving space of the device. Examples of suitable electronic auxiliary components are an electronic inverter and/or an electronic information-processing unit (optimizer) and/or an electrical junction box. Preferably, the assembly also comprises at least one solar panel arranged on at least one support rail, with the device and the auxiliary component coupled to the device being positioned under the solar panel.

The invention also relates to a method for attaching an electronic auxiliary component to a support structure for solar panels by using a device according to the invention, comprising the following steps: A) attaching the device to a support structure for one or more solar panels by means of the at least one coupling element of the device, in particular to a support rail of a support structure for solar panels, and B) arranging at least part of the electronic auxiliary component in the housing via at least one access opening of at least one housing of the device, such that the electronic component is secured with respect to the housing by at least one securing element. Preferably, the connection produced in step A) is realized by snap-fitting the device onto the support rail or another component of the support structure. In this case, it is advantageous if the device comprises several coupling elements, with each coupling element comprising at least one hook-shaped fastening element. During the arrangement of at least part of the electronic component in the housing according to step B), the securing element is preferably displaced and/or deformed with respect to a further part of the device. During the arrangement of at least part of the electronic component in the housing according to step B), the securing element is preferably displaced from a securing position, in which the securing element at least partially blocks the access opening of the housing, into or in the direction of a non-securing position, in which the securing element leaves the access opening of the housing substantially clear, such that at least part of an electronic auxiliary component can be arranged in the housing, and wherein after the aforementioned part of the electronic component has been arranged in the housing the securing element deforms back to the securing position.

The invention will be explained by means of non-limiting variant embodiments described in the following clauses:

1. Device for attaching electronic auxiliary components to a support structure for solar panels, comprising:
   at least one coupling element configured for attaching the device to a support structure for at least one solar panel, in particular to a support rail of a support structure for at least one solar panel, and
   at least one housing defining at least one receiving space and provided with at least one access opening for accommodating at least part of an electronic auxiliary component, wherein the access opening is provided with at least one securing element which is displaceable with respect to the housing to secure the electronic auxiliary component in the housing.

2. Device according to clause 1, wherein the securing element is displaceable between a securing position, in which the securing element at least partially blocks the access opening of the housing, such that at least part of the electronic auxiliary component is secured in the housing, and a non-securing position, in which the securing element substantially leaves the access opening of the housing clear, such that at least part of an electronic auxiliary component can be arranged in the housing and such that a part of an electronic auxiliary component which has been arranged in the housing can be removed from the housing.

3. Device according to clause 1 or 2, wherein the securing element is flexible.

4. Device according to any of the preceding clauses, wherein the securing element is pivotably connected to a further part of the device.

5. Device according to any of the preceding clauses, wherein the housing and the associated access opening define an insertion direction for at least part of the electronic auxiliary component, and wherein the securing element is configured to be displaced in a direction substantially perpendicular to the aforementioned insertion direction.

6. Device according to any of the preceding clauses, wherein the securing element is configured to be displaced, in particular deformed, by the electronic auxiliary component during the arrangement of at least part of the electronic auxiliary component in the housing.

7. Device according to any of the preceding clauses, wherein the securing element at least partially blocks the access opening of the housing in the unloaded condition.

8. Device according to any of the preceding clauses, wherein the securing element is on a side facing the electronic auxiliary component provided with a guiding surface for guiding the electronic auxiliary component into the receiving space.

9. Device according to any of the preceding clauses, wherein the securing element comprises at least one projecting retaining cam.

10. Device according to any of the preceding clauses, wherein the device is provided with at least one stationary guide cam which is positioned at a distance from the displaceable securing element and configured for cooperating with a slot which is provided in an electronic auxiliary component.

11. Device according to any of the preceding clauses, wherein the housing comprises at least one lower wall and at least one top wall, wherein the at least one lower wall and the at least one top wall are oriented preferably substantially parallel.

12. Device according to clause 11, wherein the securing element is connected to at least one lower wall of the housing, with the securing element preferably being enclosed by the aforementioned lower wall.

13. Device according to any of the preceding clauses, wherein the housing comprises several spaced-apart top walls which are oriented substantially parallel with respect to each other, with the securing element being positioned between two top walls of the housing.

14. Device according to any of the preceding clauses, wherein at least one coupling element comprises at least one, preferably deformable, hook-shaped fastening member.

15. Device according to clause 14, wherein the device comprises several coupling elements for attaching the device to a support rail of a support structure for solar panels, with each coupling element comprising at least one, preferably deformable, hook-shaped fastening member and with the coupling elements being configured for enclosing at least part of the support rail.

16. Device according to any of clauses 14-15, wherein at least one hook-shaped fastening member, configured for attaching the device to a support rail of a support structure for solar panels, is connected to a lower wall of the housing.

17. Device according to any of clauses 14-16, wherein the hook-shaped fastening members are configured for realizing a snap connection with a support rail.

18. Device according to any of the preceding clauses, wherein the displaceable securing element is configured for realizing a snap connection with an electronic auxiliary component.

19. Device according to any of the preceding clauses, wherein the housing is configured for multilaterally enclosing the electronic component.

20. Device according to any of the preceding clauses, wherein the device is provided with at least one additional receiving space and/or additional support structure for holding electric cables.

21. Device according to any of the preceding clauses, wherein the device is manufactured as a single piece.

22. Device according to any of the preceding clauses, wherein the device is made of at least one plastic.

23. Assembly, comprising:
  a support structure for solar panels, and
  at least one device according to any of the preceding clauses which is attached to the support structure.

24. Assembly according to clause 23, wherein the assembly also comprises an electronic auxiliary component, wherein at least part of the electronic auxiliary component is accommodated in a receiving space of the device.

25. Assembly according to clause 24, wherein the electronic auxiliary component is formed by an electronic inverter and/or an electronic efficiency-increasing unit.

26. Method for attaching an electronic auxiliary component to a support structure for solar panels by using a device according to any of clauses 1-22, comprising the following steps:

A) attaching the device to a support structure for at least one solar panel by means of the at least one coupling element of the device, in particular to a support rail of a support structure for at least one solar panel, and B) arranging at least part of the electronic auxiliary component in the housing via at least one access opening of at least one housing of the device, such that the electronic component is secured with respect to the housing by at least one securing element.

27. Method according to clause 26, wherein the connection produced in step A) is realized by snap-fitting the device onto the support rail.

28. Method according to clause 26 of 27, wherein, during the arrangement of at least part of the electronic component in the housing according to step B), the securing element is displaced with respect to a further part of the device.

29. Method according to clause 28, wherein, during the arrangement of at least part of the electronic component in the housing according to step B), the securing element is displaced from a securing position, in which the securing element at least partially blocks the access opening of the housing, to a non-securing position, in which the securing element leaves the access opening of the housing substantially clear, such that at least part of an electronic auxiliary component can be arranged in the housing, and wherein after the aforementioned part of the electronic component has been arranged in the housing the securing element deforms back to the securing position.

BRIEF DESCRIPTION OF THE DRAWINGS

The invention will be explained by means of non-limiting exemplary embodiments which are illustrated in the following figures and in which:

FIG. 1b shows a perspective view of the device as shown in FIG. 1a;

DESCRIPTION OF THE INVENTION

Figure 1A:
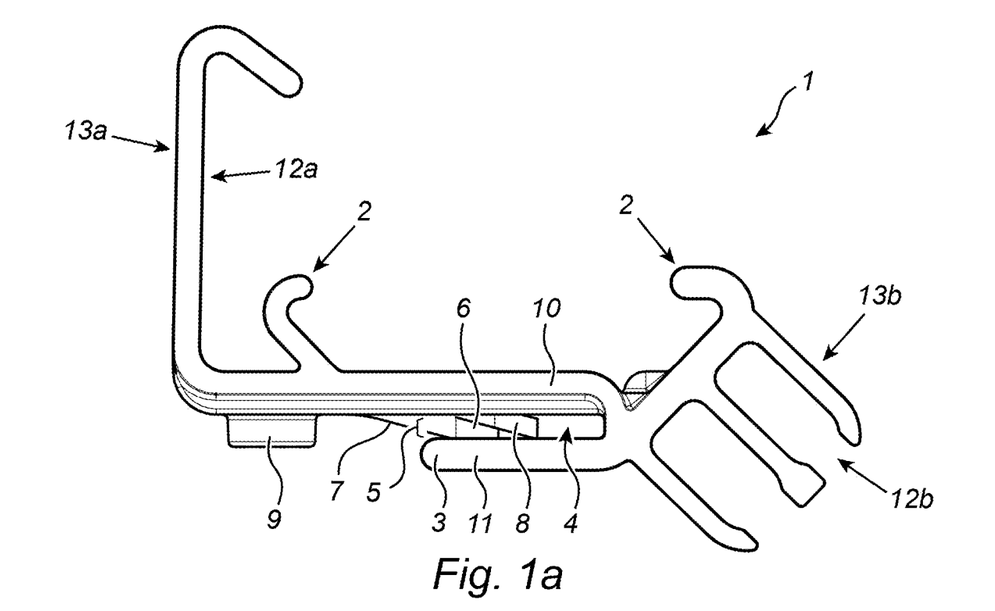
FIG. 1a shows a side view of a device according to the invention.
Figure 1B:
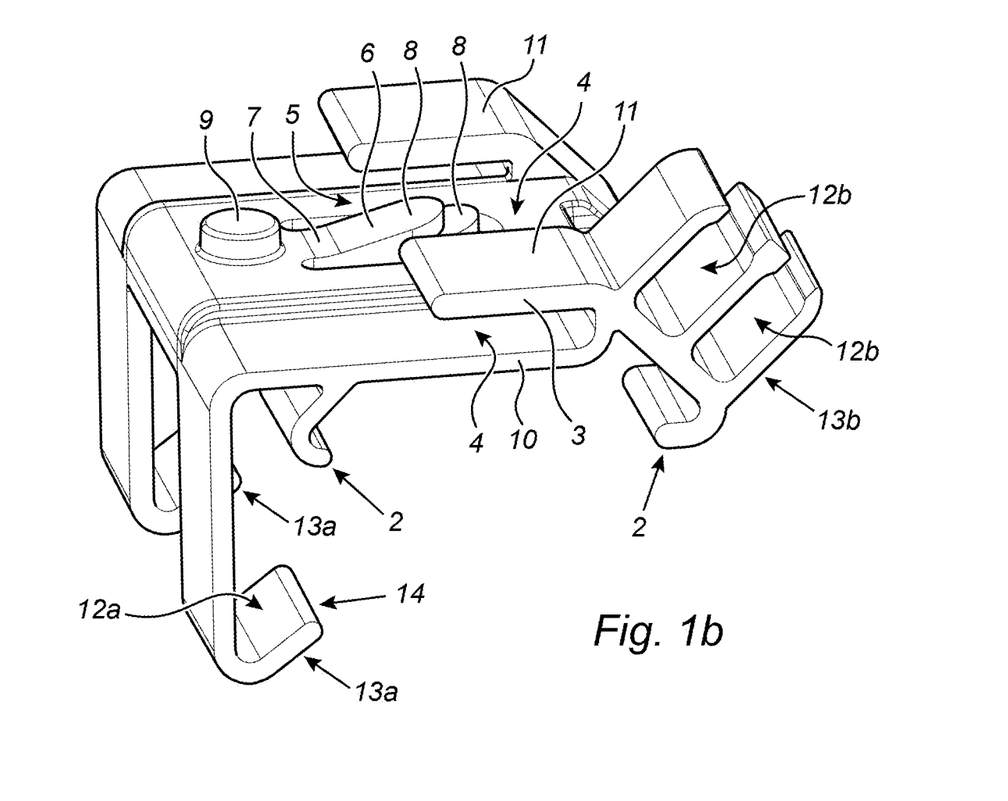

FIGS. 1a and 1b respectively show a side view and a perspective view of a device (1) according to the invention, which is also referred to as a clip (1) for attaching electronic auxiliary components to a support structure for solar panels. The device (1) comprises a housing (3) and several coupling elements (2) in the form of deformable, hook-shaped fastening members (2), configured for attaching the device (1) to a support rail of a support structure for solar panels (not shown). The housing (3) comprises a, preferably profiled, lower wall (10) and several spaced-apart top walls (11), wherein the lower wall (10) and the top walls (11) are oriented substantially parallel. The two top walls (11) are also oriented substantially parallel with respect to each other. The housing (3) defines a receiving space (4) and is furthermore provided with an access opening (5) for accommodating at least part of an electronic auxiliary component (not shown). The access opening (5) is provided with a securing element (6) which is displaceable with respect to the housing (3) for securing the electronic auxiliary component in the housing (3). In the illustrated configuration, the securing element (6) is connected to the lower wall (10) of the housing (3), with the securing element (6) being enclosed by the aforementioned lower wall (10) and being positioned between the two top walls (11) of the housing (3). The housing (3) and the access opening (5) define an insertion direction for at least part of the electronic auxiliary component, with the securing element (6) being configured to be displaced in a direction substantially perpendicular to the aforementioned insertion direction. In the illustrated unloaded position, the securing element (6), due to the flexible character of the securing element (6), partially blocks the access opening (5) of the housing (3). The securing element (6) is also provided with a slanting guiding surface (7) for guiding the electronic auxiliary component into the receiving space (4), and with several projecting retaining cams (8). The device (1) furthermore comprises a stationary guide cam (9) which is positioned at a distance from the displaceable securing element (6) and configured for cooperating with a slot (not shown) which is provided in an electronic auxiliary component. In the illustrated embodiment, the device (1) is additionally provided with several additional receiving spaces (12a, 12b) which are formed by several additional bottom and top support structures (13a, 13b) for holding electric cables (not shown). The bottom support structures (13a) are positioned such that, in a position where they are coupled to a support rail, they cooperate with the support rail, as a result of which a receiving space (12a) for the cables is defined by the support structure (13a) and the support rail. In the illustrated embodiment of the bottom support structure (13a), the support structure (13a) comprises two profiled-section parts, which are oriented substantially parallel and which are provided with an edge (14) which projects in the direction of the support structure to be fitted. The illustrated top support structure (13b) comprises several profiled-section parts which form multiple receiving spaces (12b) for cables.

Figure 2:
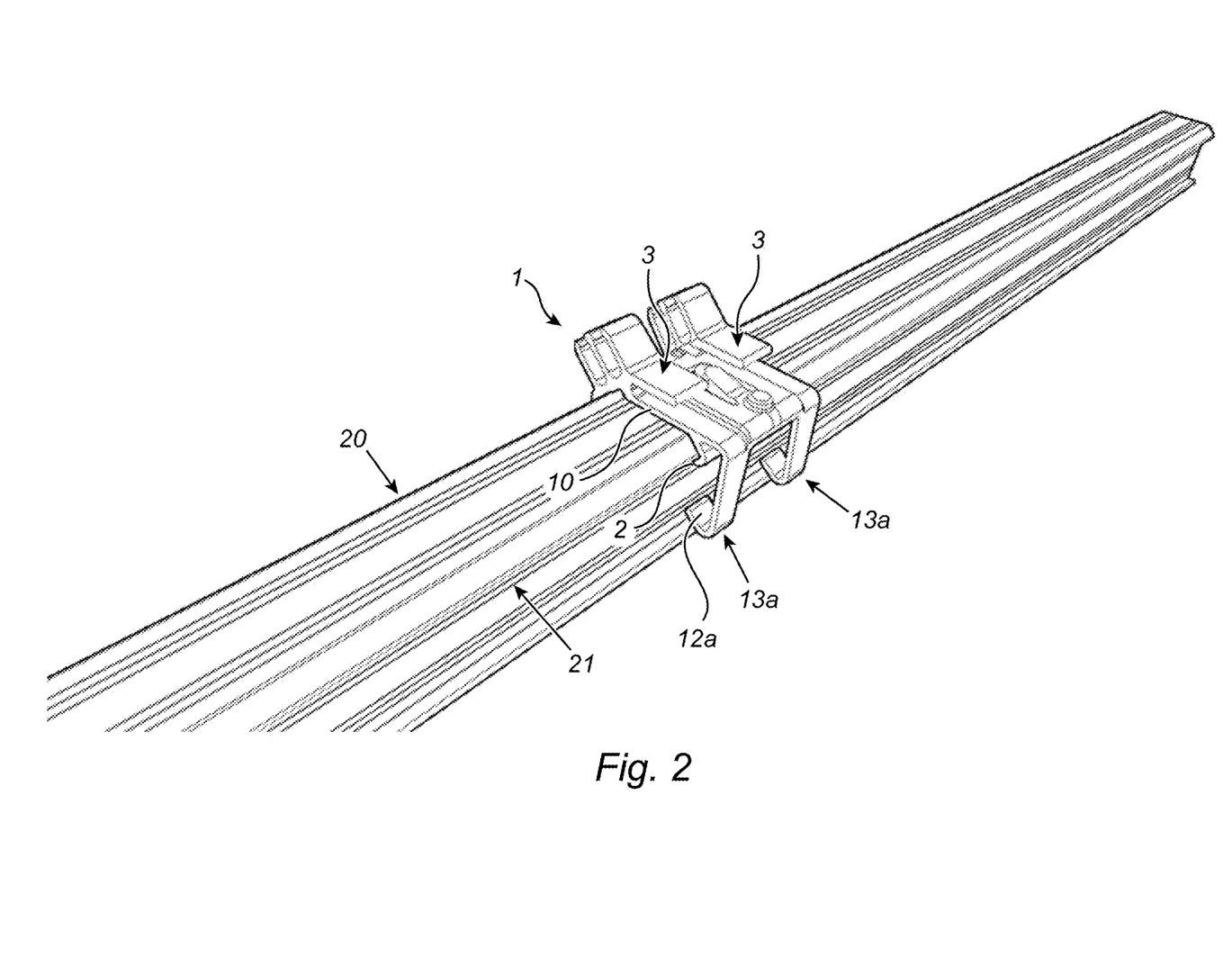
FIG. 2 shows a perspective view of an assembly of the device as shown in FIGS. 1a and 1b and a support rail.

FIG. 2 shows a perspective view of an assembly of the device (1) as shown in FIGS. 1a and 1b and a support rail (20) of a support structure for solar panels. The plurality of hook-shaped fastening members (2) are connected to a lower wall (10) of the housing (3) and are hooked onto the support rail (20). In this case, the hook-shaped fastening members (2) cooperate with a projecting structure (21) of the support rail (20), as a result of which a snap connection exists between both elements. The assembly shows the receiving space (12a) for cables which is enclosed between the support rail (20) and the bottom support structure (13a).

Figure 3:
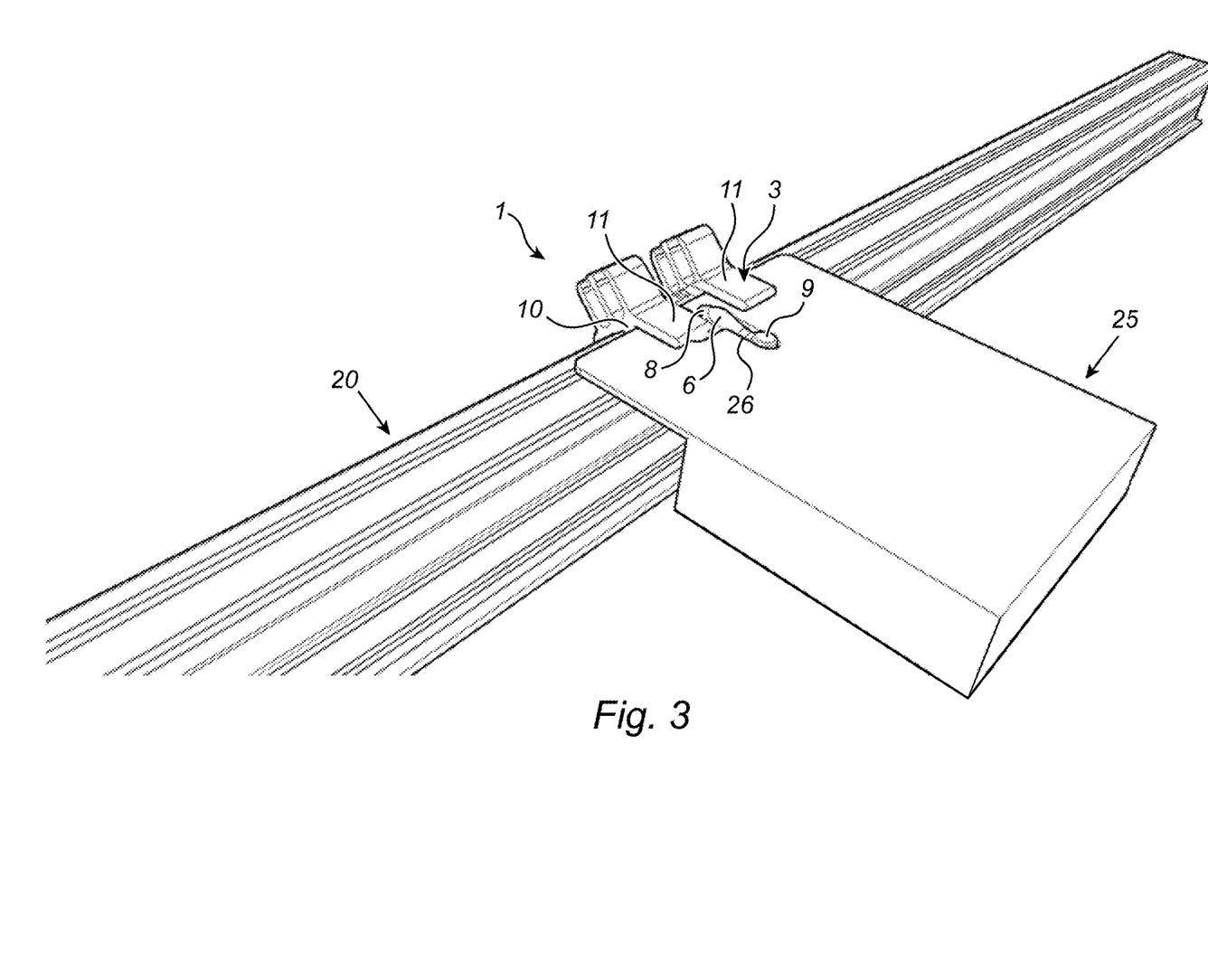
FIG. 3 shows a perspective view of an assembly as shown in FIG. 2 and an electronic auxiliary component.

FIG. 3 shows a perspective view of an assembly as shown in FIG. 2 and an electronic auxiliary component (25). Part of the electronic auxiliary component (25) is arranged in the receiving space of the housing (3) and secured in this position by means of the securing element (6). In this case, the housing (3) multilaterally encloses part of an auxiliary component (25). The distance between the lower wall (10) and the top walls (11) is adapted to the thickness of the secured part of the auxiliary component (25). The projecting retaining cam (8) of the securing element (6) prevents undesired decoupling of the auxiliary component (25) with respect to the device (1). The figure shows that the guide cam (9) is configured for cooperating with a slot (26) which is provided in the electronic auxiliary component (25).

Figure 4:
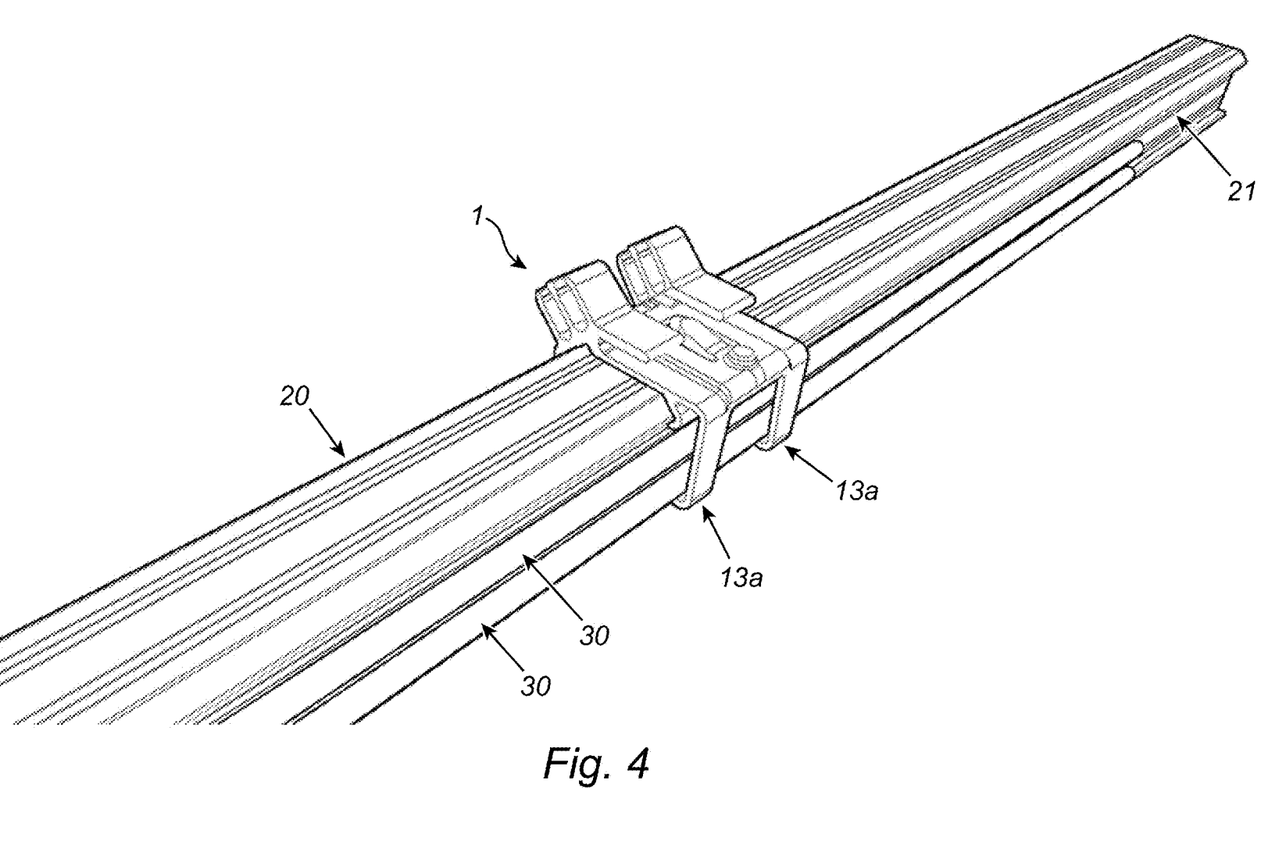
FIG. 4 shows a perspective view of an assembly as shown in FIG. 2 and electric cables.

FIG. 4 shows a perspective view of an assembly as shown in FIG. 2 and electric cables (30). The electric cables (30) are secured in the receiving space (12a) between the support rail (20) and the bottom support structure (13a). In this case, the bottom cable (30) is enclosed by the projecting profiled-section part of the support structure (13a).

Figure 5A:
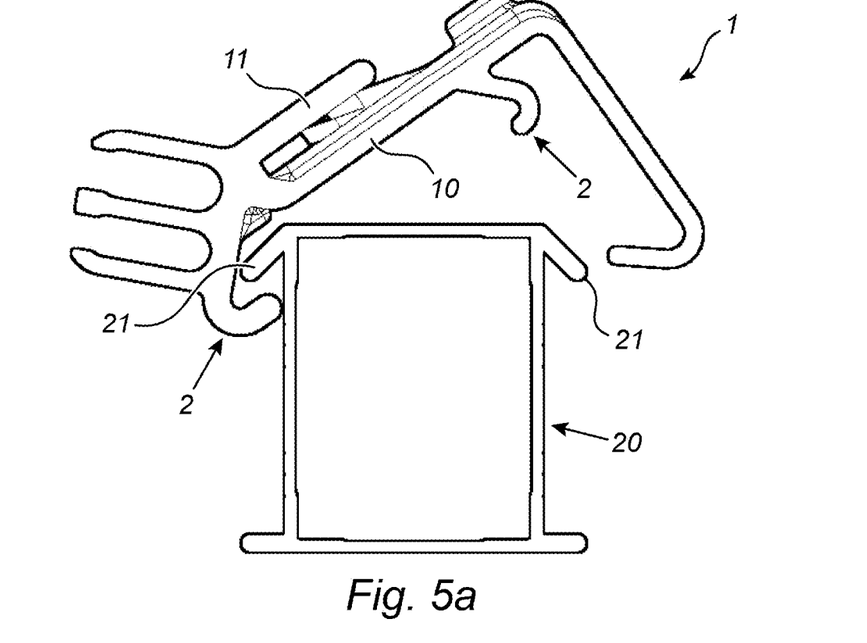
FIG. 5a shows a diagrammatic representation of the coupling of a device as shown in FIGS. 1a and 1b and a support rail.
Figure 5B:
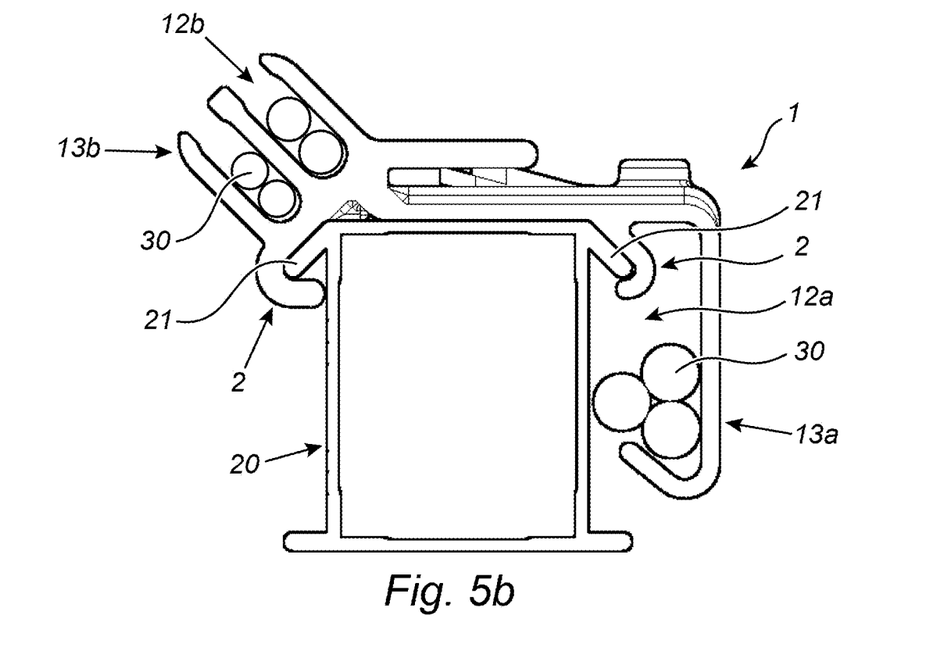
FIG. 5b shows a diagrammatic representation of the assembly from FIG. 5a in a coupled position in combination with electric cables.
Figure 6A:
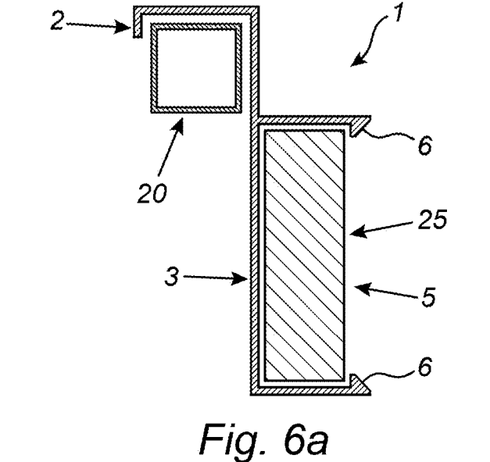
FIGS. 6a-f show diagrammatic representations of possible embodiments of an assembly of devices according to the invention and a support rail and electronic auxiliary component.
Figure 6B:
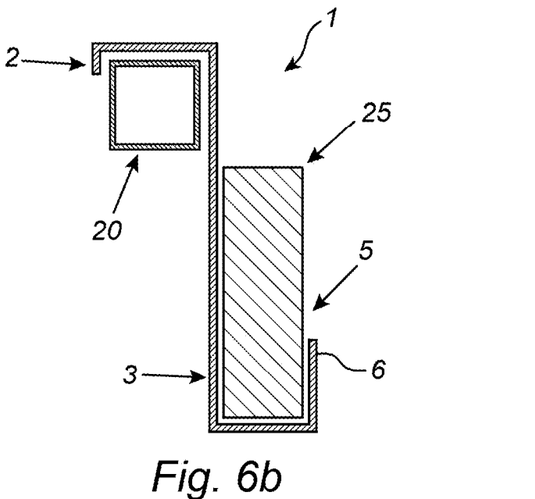
Figure 6C:
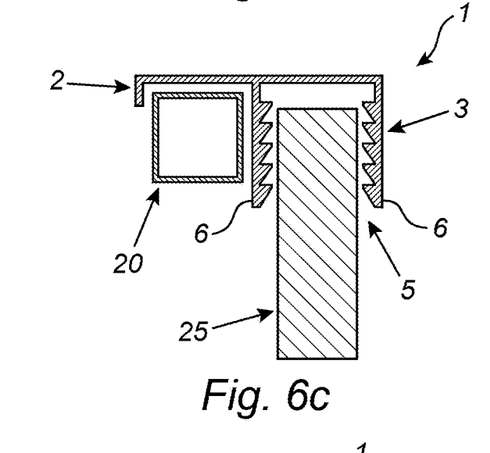
Figure 6D:
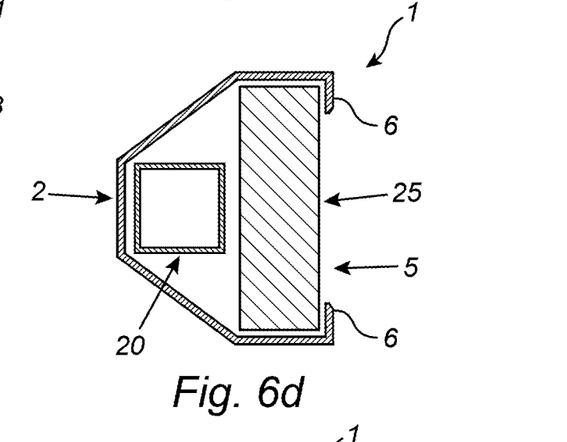
Figure 6E:
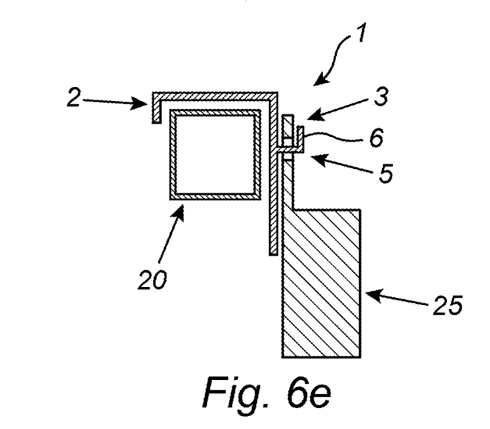
Figure 6F:
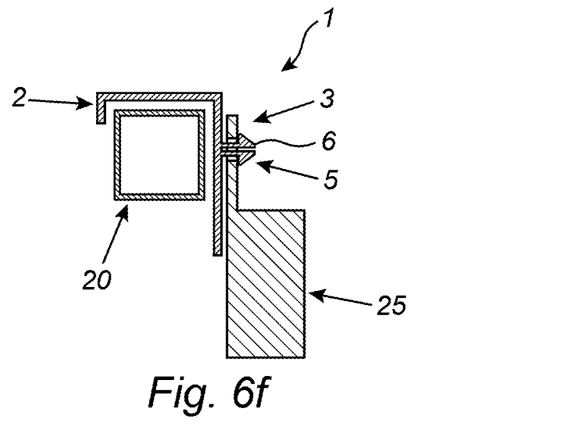

FIG. 5a shows a diagrammatic representation of the coupling of a device (1) as shown in FIGS. 1a and 1b and a support rail (20). FIG. 5b shows the assembly in a coupled position in cooperation with electric cables (30). In order to realize a coupling between the support rail (20) and the device (1), a projecting structure (21) of the support rail is arranged into the receiving opening of the outer hook-shaped fastening members (2). Subsequently, the device (1) is swung so that the lower wall (10) of the device (1) engages with the support rail (20). When the lower wall (10) is substantially parallel with the engaged side of the support rail (20), the inner hook-shaped fastening members will come into contact with a subsequent projecting structure (21) of the support rail (20). In this case, the inner hook-shaped fastening members (2) will temporarily be partially deformed, so that the support rail (20) can click into the device, as is illustrated in FIG. 5b. In the coupled position, the hook-shaped fastening members substantially completely enclose the projecting structures (21) of the support rail (20). The profiled-section parts of the bottom support structure (13a) are also configured to be able to deform temporarily in order to facilitate securement of the cables (30) in the receiving space (12a). The profiled-section parts of the top support structure (13b) are also at least partially flexible in order to assist the passage of cables (30) in the support structure (13b).

FIGS. 6a-f show possible variant embodiments of a device (1) for attaching electronic auxiliary components (25) to a support rail (20) according to the invention. The illustrated variant embodiments are provided with at least one coupling element (2) configured for attaching the device (1) to a support rail (20) and the housing (3) is provided with at least one access opening (5) for accommodating at least part of the electronic auxiliary component (25). The electronic auxiliary component (25) is in this case accommodated in a receiving space defined by the housing (3) and is secured by at least one securing element (6) which is displaceable with respect to the housing.

Figure 7:
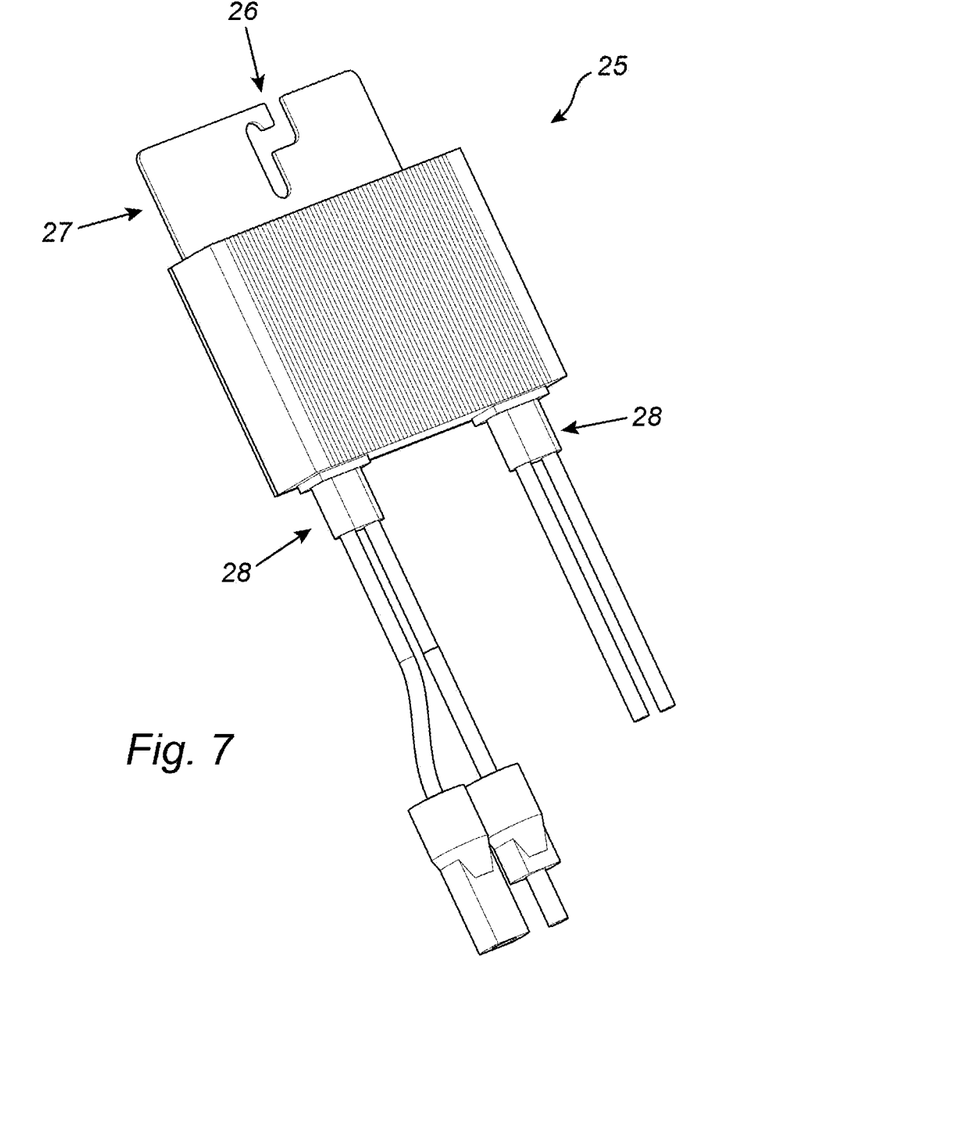
FIG. 7 shows a perspective view of an electronic auxiliary component for use in an assembly according to the invention.

FIG. 7 shows a perspective view of an electronic auxiliary component (25) for use in an assembly and cooperation with the device (1) according to the invention as illustrated in FIGS. 1-5. A slot (26) is provided in a projecting part of the housing (27) of the electronic auxiliary component (25) and configured for cooperating with the guide cam (9) of the device (1) according to the invention. In this case, the slot (26) is non-linear, in particular angular, in order to make decoupling of the auxiliary component (25) with respect to the device (1) more difficult. The electronic auxiliary component (25) is provided with wiring (28) in order to connect one or more solar panels and/or further electronic equipment (not shown).

Figure 8A:
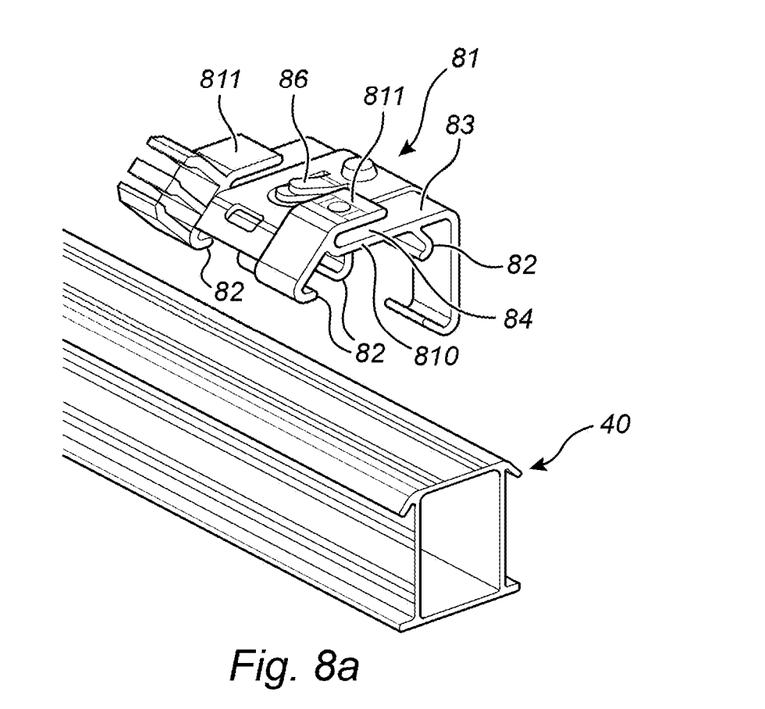
FIG. 8a shows a perspective view of a second possible variant embodiment of a device according to the invention and a support rail.
Figure 8B:
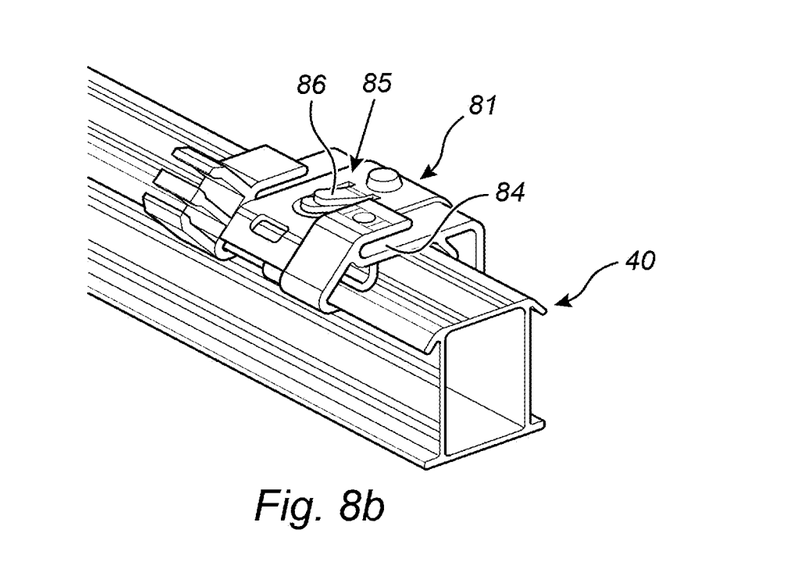
FIG. 8b shows an assembly of the device as shown in FIG. 8a and the support rail.

FIG. 8a shows a perspective view of a second possible variant embodiment of a device (81) according to the invention and a support rail (40) of a support structure for solar panels. FIG. 8b shows a perspective view of an assembly of the device (81) as shown in FIG. 8a and the support rail (40). The device (81) comprises a housing (83) and several coupling elements (82) in the form of deformable, hook-shaped fastening members (82), configured for attaching the device (81) to the support rail (40). The housing (83) comprises a lower wall (810) and two spaced-apart top walls (811), wherein the lower wall (810) and the top walls (811) are oriented substantially parallel. The two top walls (811) are also oriented substantially parallel with respect to each other. The housing (83) defines a receiving space (84) and an access opening (85) for accommodating at least part of an electronic auxiliary component (not shown). The access opening (85) is provided with a securing element (86) which is displaceable with respect to the housing to secure the electronic auxiliary component (not shown) in the housing (83).

Figure 9A:
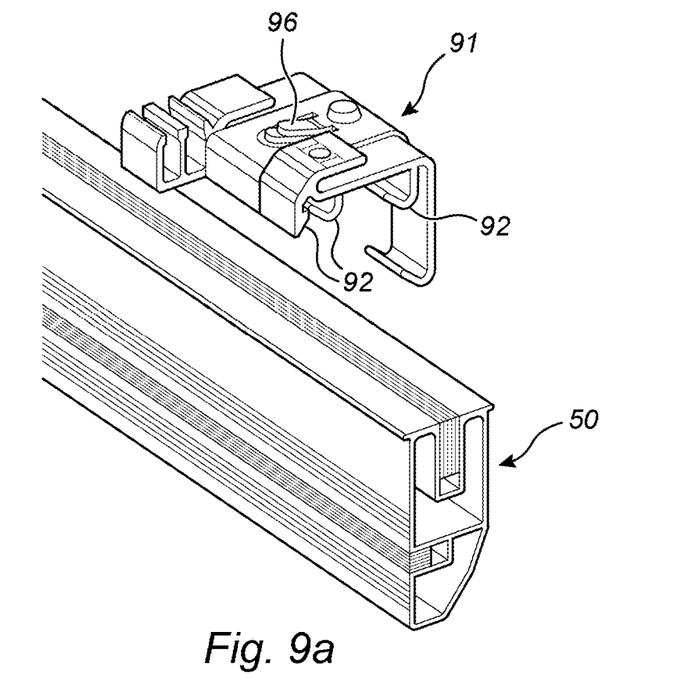
FIG. 9a shows a perspective view of a third possible variant embodiment of a device according to the invention and a support rail.
Figure 9B:
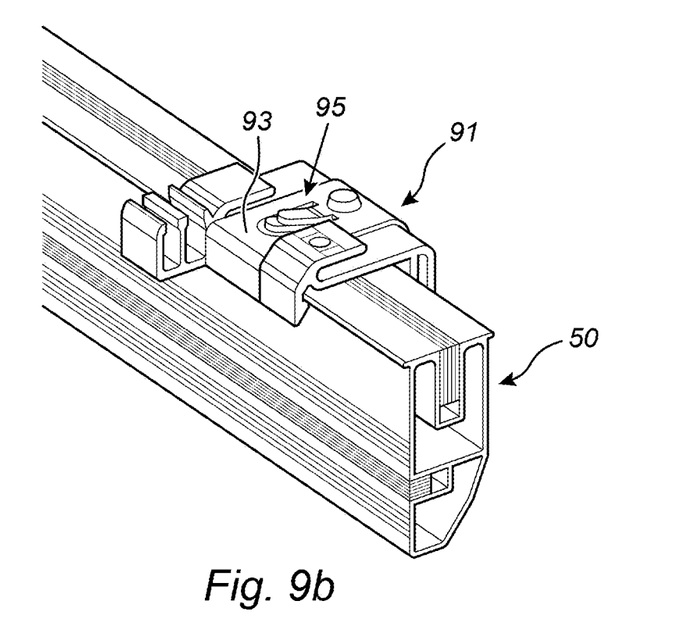
FIG. 9b shows an assembly of the device as shown in FIG. 9a and the support rail.

FIG. 9a shows a perspective view of a third possible variant embodiment of a device (91) according to the invention and a support rail (50) of a support structure for solar panels. FIG. 9b shows a perspective view of an assembly of the device (91) as shown in FIG. 9a and the support rail (50). This variant embodiment is largely identical to the variant embodiments illustrated previously. The device (91) comprises several coupling elements (92) in the form of deformable, hook-shaped fastening members (92), configured for attaching the device (91) to the support rail (50). The coupling elements (92) are adapted to cooperate with the support rail (50). The receiving space (95) in the housing (93) is identical to that in the variant embodiments illustrated in the previous figures. The same applies to the securing element (96).

Figure 10A:
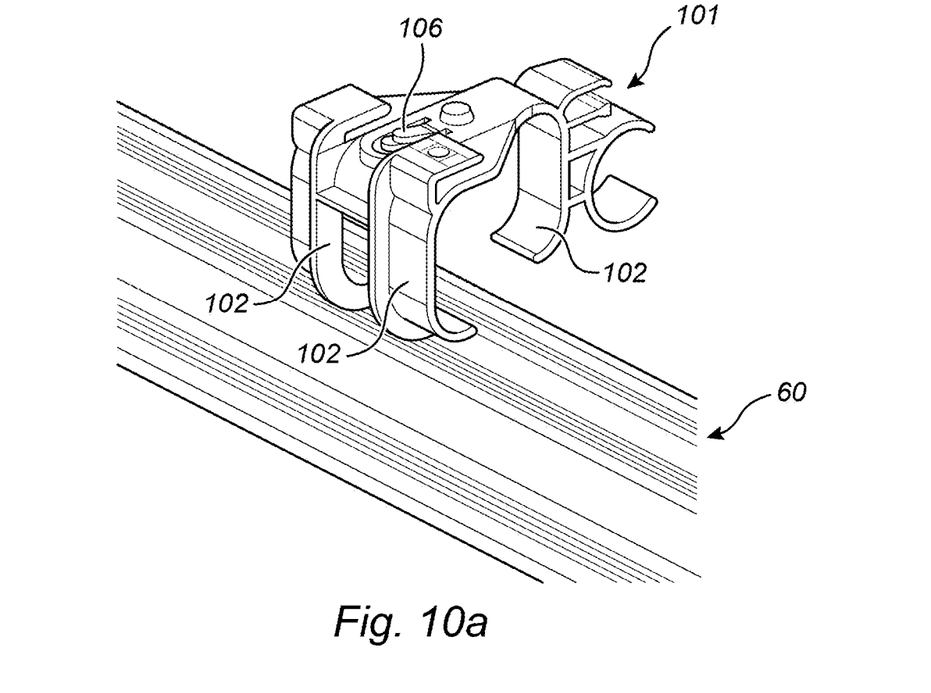
FIG. 10a shows a perspective view of a third possible variant embodiment of a device according to the invention and a support rail.
Figure 10B:
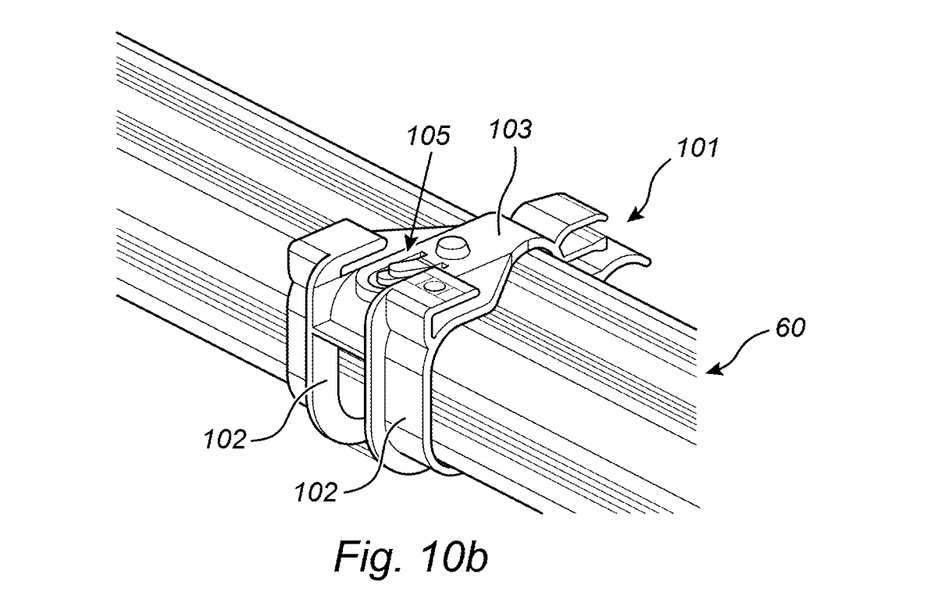
FIG. 10b shows an assembly of the device as shown in FIG. 10a and the support rail.

FIG. 10a shows a perspective view of a fourth possible variant embodiment of a device (101) according to the invention and a support rail (60) of a support structure for solar panels. FIG. 10b shows a perspective view of an assembly of the device (101) as shown in FIG. 10a and the support rail (60). The device (101) comprises three coupling elements (102) in the form of deformable, hook-shaped fastening members (102), configured for attaching the device (101) to the support rail (50). The coupling elements (102) are configured for substantially enclosing the support rail (60), as is illustrated in FIG. 10b. The receiving space (105) in the housing (103) and the securing element (106) are identical to those in the variant embodiments illustrated in the previous figures.

It will be clear that the invention is not limited to the exemplary embodiments illustrated and described here, but that countless variants which are obvious to those skilled in the art are possible without departing from the scope of the attached claims. In this case, it is conceivable for different inventive concepts and/or technical measures of the above-described variant embodiments to be fully or partially combined without in this case displacing away from the inventive idea described in the attached claims.

Throughout this patent, the verb 'comprise' and its conjugations are understood to not only mean 'comprise', but to also mean the expressions 'contain', 'substantially contain', 'formed by', and its conjugations.

The invention claimed is:

1. A device for attaching electronic auxiliary components to a support structure for solar panels comprising at least one support rail, comprising:
    at least one coupling element configured for attaching the device to the support rail of the support structure for at least one solar panel, and
    at least one housing defining at least one receiving space and provided with at least one access opening for accommodating at least part of an electronic auxiliary component, wherein the access opening is provided with at least one securing element which is displaceable with respect to the housing and pivotably connected to a further part of the device to secure the electronic auxiliary component in the housing, wherein the securing element at least partially blocks the access opening of the housing in an unloaded condition, wherein the device is provided with at least one stationary guide cam positioned at a distance from the displaceable securing element and configured for cooperating with a slot which is provided in an electronic auxiliary component.

2. The device according to claim 1, wherein the securing element is displaceable between a securing position, in which the securing element at least partially blocks the access opening of the housing, such that at least part of the electronic auxiliary component is secured in the housing, and a non-securing position, in which the securing element leaves the access opening of the housing substantially clear, such that at least part of an electronic auxiliary component can be arranged in the housing and such that a part of an electronic auxiliary component arranged in the housing can be removed from the housing.

3. The device according to claim 1, wherein the securing element is flexible.

4. The device according to claim 1, wherein the housing and the associated access opening define an insertion direction for at least part of the electronic auxiliary component, and wherein the securing element is configured to be displaced in a direction substantially perpendicular to the aforementioned insertion direction.

5. The device according to claim 1, wherein the securing element is configured to be displaced by the electronic auxiliary component during the arrangement of at least part of the electronic auxiliary component in the housing.

6. The device according to claim 1, wherein the securing element is on a side facing the electronic auxiliary component provided with a guiding surface for guiding the electronic auxiliary component into the receiving space.

7. The device according to claim 1, wherein the securing element comprises at least one projecting retaining cam.

8. The device according to claim 1, wherein the housing comprises at least one lower wall and at least one upper wall, wherein the at least one lower wall and the at least one upper wall are oriented substantially parallel.

9. The device according to claim 1, wherein at least one coupling element comprises at least one deformable hook-shaped fastening member.

10. The device according to claim 1, wherein the displaceable securing element is configured for realizing a snap connection with an electronic auxiliary component.

11. The device according to claim 1, wherein the housing is configured for multilaterally enclosing the electronic component.

12. The device according to claim 1, wherein the device is manufactured as a single piece.

13. An assembly, comprising:
- a support structure for solar panels comprising at least one support rail, and
- at least one device for attaching electronic auxiliary components to the support structure, comprising:
- at least one coupling element configured for attaching the device to the support rail of the support structure for at least one solar panel, and
- at least one housing defining at least one receiving space and provided with at least one access opening for accommodating at least part of an electronic auxiliary component, wherein the access opening is provided with at least one securing element which is displaceable with respect to the housing and pivotably connected to a further part of the device to secure the electronic auxiliary component in the housing, wherein the securing element at least partially blocks the access opening of the housing in an unloaded condition.

* * * * *